(12) United States Patent
Molander

(10) Patent No.: US 9,113,177 B2
(45) Date of Patent: Aug. 18, 2015

(54) METHODS, APPARATUSES AND COMPUTER PROGRAM PRODUCTS FOR PAUSING VIDEO STREAMING CONTENT

(75) Inventor: Daniel Molander, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 284 days.

(21) Appl. No.: 13/639,058

(22) PCT Filed: Apr. 2, 2010

(86) PCT No.: PCT/CN2010/000428
§ 371 (c)(1),
(2), (4) Date: Oct. 2, 2012

(87) PCT Pub. No.: WO2011/120204
PCT Pub. Date: Oct. 6, 2011

(65) Prior Publication Data
US 2013/0031222 A1     Jan. 31, 2013

(51) Int. Cl.
*G06F 15/16* (2006.01)
*H04N 21/2343* (2011.01)
*H04N 21/2387* (2011.01)
*H04N 21/433* (2011.01)
*H04N 21/6587* (2011.01)
*H04N 21/81* (2011.01)
(Continued)

(52) U.S. Cl.
CPC ....... *H04N 21/23439* (2013.01); *H04N 19/102* (2014.11); *H04N 19/164* (2014.11); *H04N 19/172* (2014.11); *H04N 19/46* (2014.11); *H04N 21/2387* (2013.01); *H04N 21/41407* (2013.01); *H04N 21/4333* (2013.01); *H04N 21/6587* (2013.01); *H04N 21/8153* (2013.01); *H04N 21/8455* (2013.01)

(58) Field of Classification Search
USPC .......................................... 709/203, 219, 231
See application file for complete search history.

(56) References Cited

U.S. PATENT DOCUMENTS 5,479,303 A  *  12/1995  Suzuki et al. ................. 360/72.2
2005/0055644 A1 *  3/2005  Stockton ....................... 715/766
(Continued)

FOREIGN PATENT DOCUMENTS

CN     101155301     4/2008
CN     101263716     9/2008

OTHER PUBLICATIONS

Written Opinion of the International Searching Authority for PCT/CN2010/000428, mailed Jan. 13, 2012.

*Primary Examiner* — El Hadji Sall
(74) *Attorney, Agent, or Firm* — Nixon & Vanderhye P.C.

(57) ABSTRACT

It is presented a method, performed in an application server, the application server being part of a video streaming system further comprising a streaming server and a mobile streaming client. The method comprises the steps of: obtaining a pause timestamp representing a time where the mobile streaming client has paused video streaming content; determining a reference to a high quality image corresponding to an image of the video streaming content at the pause timestamp, wherein the high quality image is of a higher quality than the image of the video streaming content and the high quality image is stored separately from the video streaming content; and sending a high quality image message to the mobile streaming client comprising the reference to the high quality image. Corresponding client method, application server, mobile streaming client and computer program and computer program products are also presented.

15 Claims, 6 Drawing Sheets

(51) Int. Cl.
*H04N 21/845* (2011.01)
*H04N 21/414* (2011.01)
*H04N 19/172* (2014.01)
*H04N 19/46* (2014.01)
*H04N 19/102* (2014.01)
*H04N 19/164* (2014.01)

(56) References Cited

U.S. PATENT DOCUMENTS

2006/0050785 A1    3/2006   Watanabe et al.
2009/0141810 A1    6/2009   Tabatabai et al.
2009/0254948 A1*  10/2009   Middleton et al. .............. 725/62

* cited by examiner

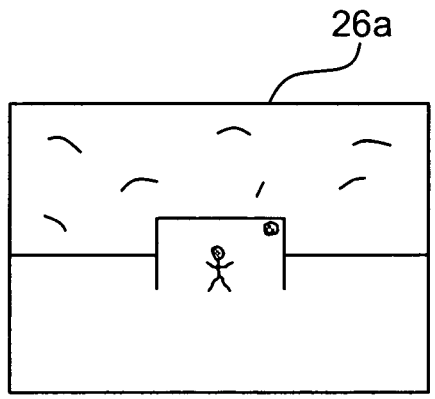 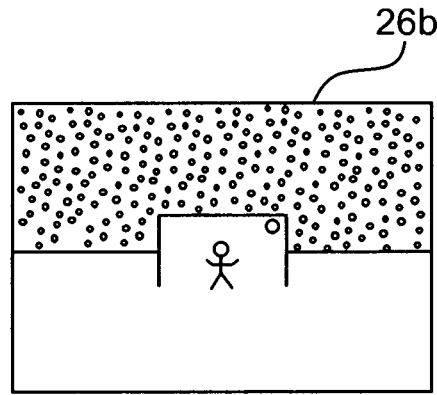
Fig. 3a            Fig. 3b
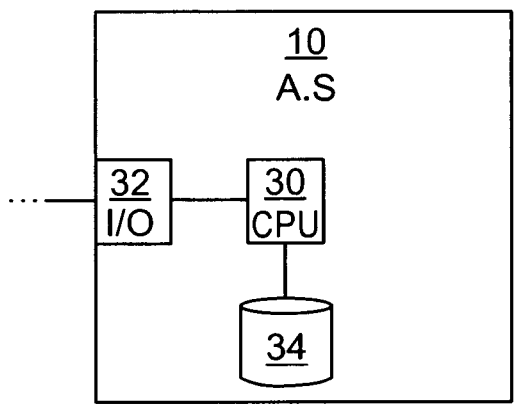
Fig. 4
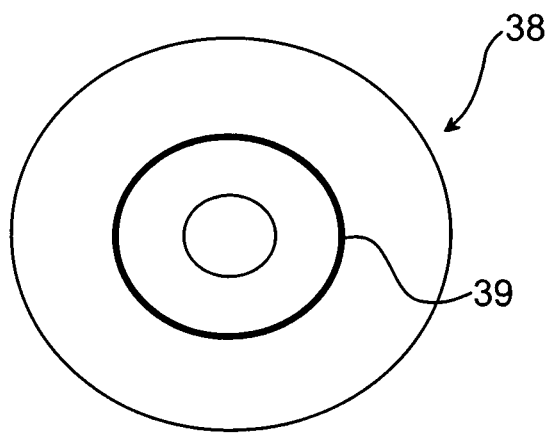
Fig. 5

METHODS, APPARATUSES AND COMPUTER PROGRAM PRODUCTS FOR PAUSING VIDEO STREAMING CONTENT

This application is the U.S. national phase of International Application No. PCT/CN2010/000428, filed 2 Apr. 2010, the entire contents of which is hereby incorporated by reference.

TECHNICAL FIELD

The invention relates generally to video streaming content, and more particularly to pausing video streaming content.

BACKGROUND

Streaming of video and audio content to mobile streaming clients, such as mobile phones, is becoming more and more popular. However, to allow streaming to mobile streaming clients over mobile (cellular) networks, the content needs to be compressed significantly.

Particularly when mobile (cellular) networks are used, the streaming content is compressed hard, where bit rates commonly are less than 384 or even 240 kbps (kilobits per second) to allow streaming over the mobile network where bandwidth is limited. However, such aggressive compression leads to lower quality video. While this may be less noticeable during normal video playing, it is all too apparent when the content is paused.

The U.S. patent application publication U.S.-2006/0050785 presents a system where a high resolution still image is inserted into a stream of lower resolution video. The lower resolution video stream is a compressed video stream having I-frames. One of the I-frames is a lower resolution version of a higher resolution image. The I-frame is decoded and decompressed and zoomed up in size to the high resolution size. However, the resulting content stream of this system is not appropriate for streaming over mobile networks, since the resulting video stream contains more data than a regular video stream. The bandwidth requirements, if the presented system is implemented for mobile networks, would be even more than a regular video stream encoded for mobile networks.

Consequently, there is a need to improve the still image quality when pausing video streamed to mobile streaming client.

SUMMARY

An object of the invention is to provide methods, an application server, a mobile streaming client, computer programs and computer program products to improve the quality when pausing video streamed to a mobile streaming client.

According to a first aspect of the invention, it is presented a method, performed in an application server, the application server being part of a video streaming system further comprising a streaming server and a mobile streaming client. The method comprises the steps of: obtaining a pause timestamp representing a time where the mobile streaming client has paused video streaming content; determining a reference to a high quality image corresponding to an image of the video streaming content at the pause timestamp, wherein the high quality image is of a higher quality than the image of the video streaming content and the high quality image is stored separately from the video streaming content; and sending a high quality image message to the mobile streaming client comprising the reference to the high quality image.

In this way, the mobile streaming client is provided with an image which can be of a significantly higher quality than if the stream is paused normally. Since the high quality images are stored separately, e.g. as separate image files, they can be encoded in any desired quality, where this should be balanced against storage requirements for the high quality images. Moreover, since the high quality images are stored separately, they are not part of the video streaming content, whereby the bandwidth requirements for playing the video streaming content remain unchanged.

The step of obtaining a pause timestamp may comprise accessing a most recently stored bookmark of the video streaming content for the mobile streaming client, wherein the most recently stored bookmark comprises the pause timestamp. By using a bookmark, the streaming server can store the pause timestamp, whereby the mobile streaming client does not need to be modified to send the pause timestamp to the application server.

The step of obtaining a pause timestamp may comprise receiving a message from the mobile streaming client comprising the pause timestamp. Optionally, if the mobile streaming client sends the pause timestamp to the application server, there is no need to save a bookmark to obtain the pause timestamp.

The high quality image may be of a higher resolution than the image of the video streaming content.

The high quality image may be an image previously encoded using only one frame of original content, and the image of the video streaming content may be a predictive frame.

The reference may be a URI, Uniform Resource Identifier, pointing to the high quality image.

The method may further comprise the step, prior to the step of determining a reference, of: determining whether there are any high quality images stored for the video streaming content, and ending the method when there are no high quality images stored for the video streaming content. In other words, there may be some content which has corresponding high quality images and other content which does not have corresponding high quality images.

The step of sending a high quality image message may comprise sending data allowing the mobile streaming client to access high quality images between a first timestamp and a second timestamp, wherein the first timestamp is before the pause timestamp and the second timestamp is after the pause timestamp. This allows the mobile streaming client to easily and efficiently skip to high quality images before and/or after the pause image.

The number of high quality images between the first timestamp and the second timestamp may be at most half of the frames of the video content corresponding to a sequence between the first timestamp and the second timestamp. By omitting some frames for high quality images, storage space is saved on the server side.

A second aspect of the invention is a method, performed in a mobile streaming client, the mobile streaming client being part of a video streaming system further comprising a streaming server and an application server. The method comprises the steps of: receiving video streaming content and rendering the video streaming content on a display of the mobile streaming client; receiving input to pause the video streaming content; sending a pause message indicating that the mobile streaming client has paused the video streaming content at a pause timestamp; receiving a high quality image message from the application server, the high quality image message comprising a reference to a high quality image corresponding to an image of the video streaming content at the pause timestamp, wherein the high quality image is of a higher quality than the image of the video streaming content and the high quality image is stored separately from the video streaming content; and presenting the high quality image on the display of the mobile streaming client.

The method may further comprise, prior to the step of presenting the high quality image, the step of: prompting whether the high quality image is to be presented, and the step of presenting may comprise presenting the high quality image on the display of the mobile streaming client only after a user input has been received indicating that the high quality image is to be presented.

The step of receiving a high quality image message may comprise receiving data allowing the mobile streaming client to access high quality images between a first timestamp and a second timestamp, wherein the first timestamp is before the pause timestamp and the second timestamp is after the pause timestamp.

A third aspect of the invention is an application server, arranged to be part of a video streaming system further comprising a streaming server and a mobile streaming client, the application server comprising a controller and an input and output interface. The controller is arranged to obtain a pause timestamp representing a time where the mobile streaming client has paused video streaming content; the controller is arranged to determine a reference to a high quality image corresponding to an image of the video streaming content at the pause timestamp, wherein the high quality image is of a higher quality than the image of the video streaming content and the high quality image is stored separately from the video streaming content; and the controller is arranged to send, using the input and output interface, a high quality image message to the mobile streaming client comprising the reference to the high quality image.

A fourth aspect of the invention is a mobile streaming client, arranged to be part of a video streaming system further comprising a streaming server and an application server, the mobile streaming client comprising a controller, a display, an input and output interface and a memory the controller implements a pausing function. The controller is arranged to receive video streaming content and render the video streaming content on the display; the controller is arranged to receive input to pause the video streaming content; the controller is arranged to send a pause message indicating that the mobile streaming client has paused the video streaming content at a pause timestamp; the controller is arranged to receive a high quality image message from the application server, the high quality image message comprising a reference to a high quality image corresponding to an image of the video streaming content at the pause timestamp, wherein the high quality image is of a higher quality than the image of the video streaming content and the high quality image is stored separately from the video streaming content; and the controller is arranged to present the high quality image on the display of the mobile streaming client. The mobile streaming client may thus download the high quality image to memory to allow the high quality image to be presented on the display.

A fifth aspect of the invention is a computer program for an application server, which application server, when in use, is part of a video streaming system further comprising a streaming server and a mobile streaming client. The computer program comprises computer program code which, when run on the application server, causes the application server to perform the steps of: obtaining a pause timestamp representing a time where the mobile streaming client has paused video streaming content; determining a reference to a high quality image corresponding to an image of the video streaming content at the pause timestamp, wherein the high quality image is of a higher quality than the image of the video streaming content and the high quality image is stored separately from the video streaming content; and sending a high quality image message to the mobile streaming client comprising the reference to the high quality image.

A sixth aspect of the invention is a computer program product comprising a computer program according to the fifth aspect and a computer readable means on which the computer program is stored.

A seventh aspect of the invention is a computer program for a mobile streaming client, which mobile streaming client, when in use, is part of a video streaming system further comprising a streaming server and an application server. The computer program comprises computer program code which, when run on the mobile streaming client causes the mobile streaming client to perform the steps of: receiving video streaming content and rendering the video streaming content on a display of the mobile streaming client; receiving input to pause the video streaming content; sending a pause message indicating that the mobile streaming client has paused the video streaming content at a pause timestamp; receiving a high quality image message from the application server, the high quality image message comprising a reference to a high quality image corresponding to an image of the video streaming content at the pause timestamp, wherein the high quality image is of a higher quality than the image of the video streaming content and the high quality image is stored separately from the video streaming content; and presenting the high quality image on the display of the mobile streaming client.

A eighth aspect of the invention is a computer program product comprising a computer program according to the seventh aspect and a computer readable means on which the computer program is stored.

It is to be noted that, when applicable, any aspects of the first, third, fifth and sixth aspects can be applied to any other of these aspects. Furthermore when applicable, any aspects of the second, fourth, seventh and eighth aspects can be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
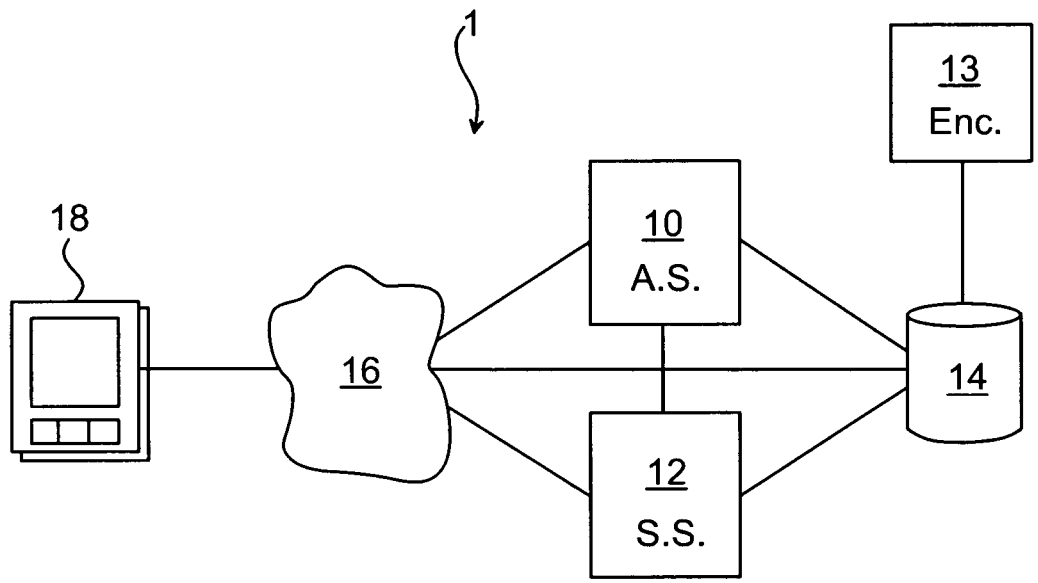
FIG. 1 schematically shows an environment where embodiments may be applied.

FIG. 1 shows an environment where embodiments may be applied. One or more mobile streaming clients 18 are devices which can receive streaming content, such as video and audio, and play the content for a user. Each mobile streaming client 18 has access to a wide area network 16, such as the Internet.

An application server 10 and a streaming server 12 are also connected to the wide area network. This allows the mobile streaming client 16 to communicate with the application server 10 to e.g. to control the streaming content from the streaming server 12. For example, the mobile streaming client 16 may comprise a web browser which communicates with a web server on the application server to browse content, such as content comprising both video and audio. Once the user of the mobile streaming client has decided what content to watch, the mobile streaming client 18 sets up a session with the streaming server 12, e.g. using RTSP/RTP (Real Time Streaming Protocol/Real-time Transfer Protocol). RTSP can be used to send control signals, such as SETUP, PLAY, PAUSE, TERMINATE, which is known in the art per se. RTP can be used to transfer the actual content to the mobile streaming client 18.

A storage device 14 is connected to the application server 10, the streaming server 12 and an encoder 13. The storage device 14 is also connected to the wide area network 16, optionally using an internal or external file server, e.g. a web server (e.g. the application server 10), file transfer protocol server and/or a streaming server (e.g. the streaming server 12). One or more directories of the storage device can for example be mounted as a file systems on any or all of the application server 10, streaming server 12 and the encoder 13, using a remote mounting protocol such as NFS (Network File System), Apple Filing Protocol (AFP), Server Message Block (SMB)/Common Internet File System, (CIFS), Web-based Distributed Authoring and Versioning (WebDAV), File Transfer Protocol (FTP), etc.

The storage device 14 comprises persistent storage, which, for example, can be any single one or combination of magnetic memory (e.g. hard drive), optical memory, or solid state memory.

The storage device 14 stores streaming content. The streaming content files can for example be MPEG-4 (Moving Picture Experts Group 4)/H.264 compliant files or MPEG-2 compliant files comprising both audio and video data, or video/audio files of any other suitable format. It is to be noted that the files are not required to contain audio data; the files may optionally contain only video data. Separately, the storage device 14 stores image files, e.g. JPEG (Joint Photographic Experts Group), PNG (Portable Network Graphics) files or any other suitable image files. Separately is here to be construed as the image files being stored in files separate from the streaming media files. This allows fast and efficient random access to an image file when needed, such as when the streaming content is paused and a high quality pause image is to be requested by the mobile streaming client 18.

The encoder 13 encodes the original content, such as high quality video/audio or broadcast content (cable, terrestrial or satellite), to a streaming content file and separate high quality image files. The separate high quality image files can be encoded with higher resolution and/or less aggressive compression compared to the streaming content, allowing higher quality images to displayed in the mobile streaming client when the streaming is paused, as is explained in more detail below.

Figure 2:
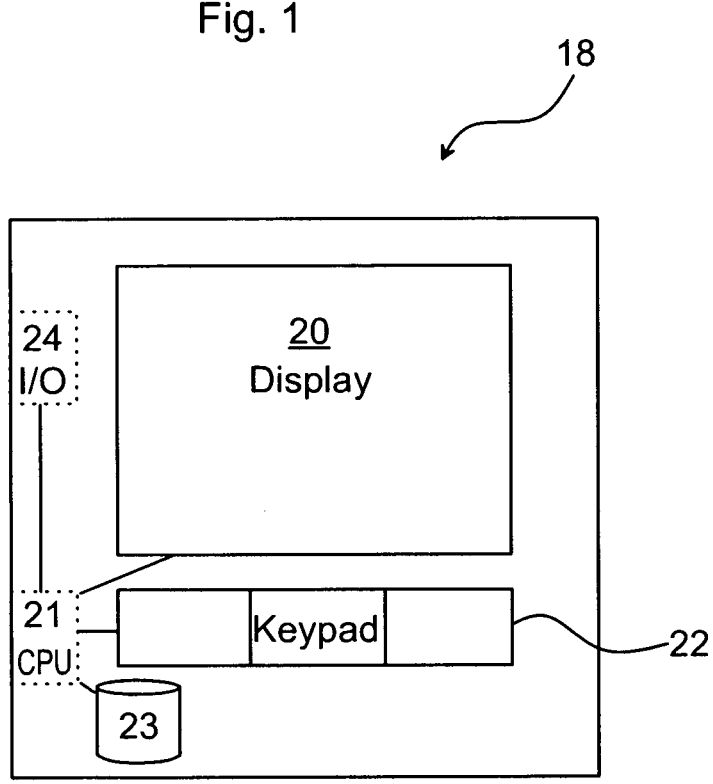
FIG. 2 schematically shows an embodiment of the mobile communication terminal of FIG. 1, FIGS. 3a and 3b are schematic screen shots illustrating the difference between a regular streaming content pause and a high quality image pause, FIG. 4 schematically shows an embodiment of the application server of FIG. 1, FIG. 5 schematically shows one example of a computer program product comprising computer readable means, FIG. 6 schematically shows an embodiment of the storage device of FIG. 1, FIGS. 7a and 7b illustrate an embodiment with a variation in frequencies for streaming frames and frequencies of high quality images stored in the storage device of FIG. 1.

FIG. 2 schematically shows an embodiment of the mobile streaming client 18 of FIG. 1. The mobile streaming client 18 comprises user interface elements such as a display 20, a keypad 22 and a speaker (not shown) or audio output for e.g. headphones (not shown). Optionally, the display 20 is a touch sensitive display, reducing or eliminating the need for the keypad 22. The mobile streaming client 18 further comprises a controller 21 capable of executing instructions e.g. stored in memory 23. The memory 23 can thus be in the form of a computer program product comprising instructions for how the mobile streaming client is to implement high quality pausing. The mobile streaming client 18 further comprises an input/output interface 24 for communicating with the wide area network 16 of FIG. 1 using one or more wireless and/or wired communication protocols. For example, the input/output interface can comply with protocols including, but not limited to, UMTS (Universal Mobile Telecommunications System), EDGE (Enhanced Data Rates for GSM Evolution), CDMA-2000 (Code Division Multiple Access-2000), IEEE 801.11x, WiMAX (Worldwide Interoperability for Microwave Access), LTE (Long Term Evolution), Ethernet, USB (Universal Serial Bus), FireWire, etc.

FIGS. 3a and 3b are schematic screen shots illustrating the difference between a streaming content pause and a high quality image pause. For MPEG-2, the raw frames be compressed into three kinds of frames: intra-coded frames (I-frame), predictive-coded frames (P-frames), and bidirectionally-predictive-coded frames (B-frames). An I-frame is a compressed version of a single uncompressed (raw) frame. The I-frame can for example be coded using JPEG. Between I-frames, there are B-frames and P-frames which are predictive frames utilising changes over time between frames. Typically, about every $15^{th}$ frame is an I frame, whereby the majority of frames are either P-frames or B-frames. Similarly, the majority of frames in an MPEG-4/H.264 stream are predictive frames.

Particularly when mobile (cellular) networks are used, the streaming content is compressed hard, e.g. less than 200 kbps (kilobits per second) to be able to be streamed over the mobile network. However, such hard compression leads to lower quality video. While this may not be so noticeable during normal video playing, it is all too apparent when the content is paused. FIG. 3a illustrates schematically a screen shot 26a of a paused image of the streaming content. According to embodiments described herein, the storage device (14 of FIG. 1) separately stores image files with higher quality than the streaming content. FIG. 3b illustrates schematically a screen shot 26b of a paused image which is the separately stored image file corresponding to the same point in time as the first paused image 26a. The second image 26b has e.g. a higher resolution and/or less aggressive compression compared to the first image 26a, whereby e.g. the ball of a football game or the audience is much more clearly visible to the user of mobile streaming client.

FIG. 4 schematically shows an embodiment of the application server 10 of FIG. 1. A controller 30 is provided using any suitable central processing unit (CPU), microcontroller, digital signal processor (DSP), etc., capable of executing software instructions stored in a computer program product 34, e.g. in the form of a memory. The computer program product 34 can be any combination of read and write memory (RAM) and read only memory (ROM). The memory 34 also comprises persistent storage, which, for example, can be any single one or combination of magnetic memory, optical memory, or solid state memory or even remotely mounted memory in form of the storage device 14 of FIG. 1. The computer program product 34 can be co-located with memory for storing streaming correspond high quality images.

An input/output interface 32 is provided to allow the application server 10 to interact with other components, such as one or more mobile streaming clients 18, streaming server 12 and storage device 14. The input/output interface 24 can for example be a network interface such as an Ethernet interface. In the case that the application server is co-located with another device, such as the streaming server and/or the storage device 14, some or all of the controller 30, the computer program product 34 and input/output interface 32 can be shared with the other device or devices.

Optionally, a user interface is provided (not shown) for operator usage of the application server 10. Additionally or alternatively, the application server 10 can be operated remotely or locally using the input/output interface 32.

The application server 10 can be integrated in one unit, or it can be separated into several separate units, e.g. for reasons of upgradeability, ease of implementation or redundancy. In the case that there are several units that make up the application server 10, some components may be present in more than one unit, such as the controller 30, the input/output interface 32 and/or the storage 34.

FIG. 5 schematically shows one example of a computer program product 38 comprising computer readable means 39. On this computer readable means 39, a computer program can be stored, which computer program can cause a computer to execute the method according to embodiments described herein. In this example, the computer program product is an optical disc, such as a CD (compact disc), a DVD (digital versatile disc) or a blu-ray disc. The computer readable means can also be solid state memory, such as flash memory or a software package distributed over a network, such as the Internet.

Figure 6:
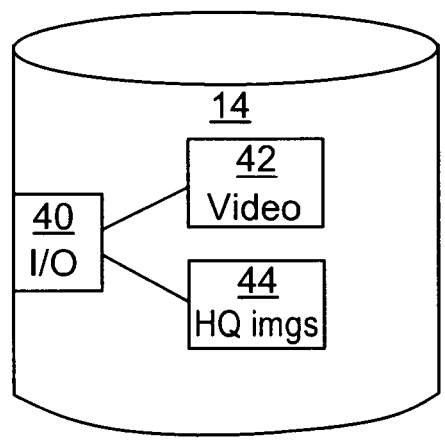

FIG. 6 schematically shows an embodiment of the storage device 14 of FIG. 1. The storage device 14 comprises an input/output interface and persistent storage for streaming content, e.g. video 42 and for high quality images 44. The streaming content 42 and the high quality images 44 are stored as separate files. The high quality images 44 may each be stored as an individual file, e.g. in a directory corresponding to a streaming content. The input/output interface 40 is provided to allow the storage device 14 to interact with other components, such as the application server 10, streaming server 12 and even mobile streaming clients 18. The input/output interface 40 can for example be a network interface such as an Ethernet interface. The persistent storage of the storage device 14 can be any single one or combination of magnetic memory, optical memory, or solid state memory. Optionally, the storage device 14 also includes volatile memory, such as Random Access Memory (RAM) for caching, etc. The storage device 14 can for example be implemented using a Storage Area Network (SAN) and/or Network Attached Storage (NAS).

Figure 7A:
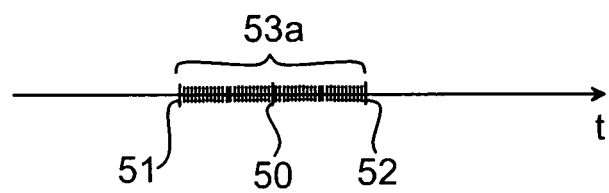
Figure 7B:
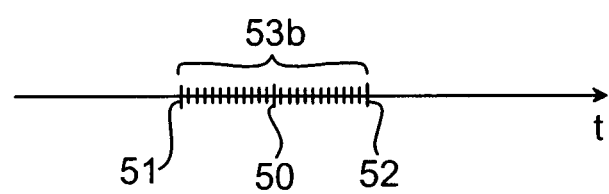

FIGS. 7a and 7b illustrate an embodiment with a variation in frequencies for streaming frames and frequencies of high quality images stored in the storage device of FIG. 1. The vertical lines in FIGS. 7a and 7b illustrate frames. FIG. 7a illustrates the number of frames 53a that are part of the video streaming content between a first timestamp 51 and a second timestamp 52, e.g. prior and after a pause timestamp 50. FIG. 7b illustrates an example where the number of high quality images 53b that correspond to the video streaming content between the first timestamp 51 and the second timestamp 52 are fewer than the corresponding frames 53a of the streaming content. In other words, each frame of the video content does not have an exact correspondence in a high quality frame. Instead, the closest frame in time is picked when a pause is performed, e.g. at pause timestamp 50. By having fewer high quality frames, storage requirements are reduced while still being able to show high quality images. In one example, the number of high quality images are at most half of the frames of the corresponding video content.

Figure 8:
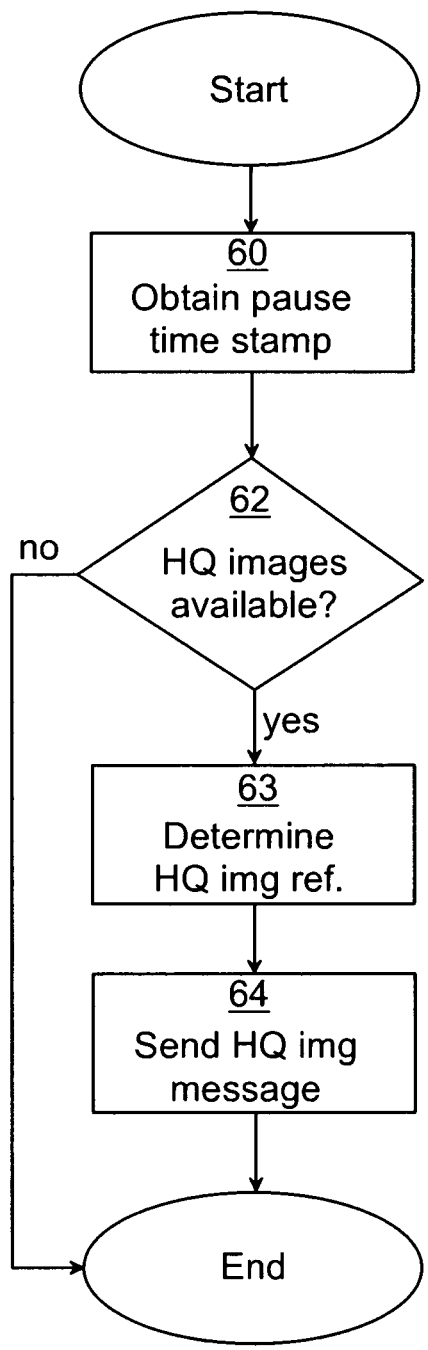
FIG. 8 is a flow chart illustrating a method performed in the application server of FIG. 1.

FIG. 8 is a flow chart illustrating a method performed in the application server 10 of FIG. 1. The method starts when a user of the mobile streaming client 18 of FIG. 1 pauses a currently streaming video content.

In an initial obtain pause timestamp step 60, the application server obtains the timestamp of when the content is paused. This can for example be provided in a bookmark message from the streaming server, where the pause timestamp is included in the bookmark message. Optionally, the application server receives a message from the mobile streaming client 18, such as a request for a high quality image, which message includes the pause timestamp.

In a conditional high quality (HQ) images available step 62, it is determined whether there are any high quality images available corresponding to the pause timestamp of the streaming video content in question. If there is no high quality image available, the method ends. Otherwise, where there is a corresponding high quality image available, the method continues to a determine high quality image reference step 63.

In the determine high quality image reference step 63, the application server first determines which high quality image corresponds to the pause timestamp. Firstly, the application server determines what directory corresponds to the streaming video content. For example, the directory could be something like:

/content/fifa2010/game12/in the file system of the application server 10 or the storage device 14, or in a file system of the storage device mounted to the application server 10.

The directory contains all jpeg images being the high quality images of game 12 of Fifa 2010. As one example, the images could be named in accordance with timestamps, e.g. a high quality image with the name of 00001000.jpg would correspond to an image exactly one second into the video content while a high quality image with the name of 00001040.jpg would correspond to an image exactly 1.04 seconds into the video content (which would be the next frame if the frame rate is 25 frames per second). Other timestamp formats can be used as appropriate.

The application server then constructs a URI, Uniform Resource Identifier, based on the determined directory and high quality image. For example, for the content in the example above, and a pause performed at one second into the content could result in a URI such as:

http://server/content/fifa2010/game12/00001000.jpg

Optionally, the application server determines an array of URIs corresponding to images some time before and after the pause timestamp. This will allow the mobile streaming client to step back and forth between high quality images without having to get new URIs from the application server. For example, the application server can determine the URIs for all high quality images of FIG. 7*b*, corresponding to the vertical lines, between the first timestamp 51 and the second timestamp 52 when the pause timestamp 50 is in between the first and the second timestamps 51, 52. The number of timestamps that are determined can be configured by the operator of the application server and/or the mobile streaming client. Other, more compact representations of a set of frames could be used, such as the high quality image URI as presented above, along with syntax descriptors for accessing frames before or after the image of the pause timestamp.

In a send high quality image message step 64, the application server 10 sends a message to the mobile streaming client comprising the URI or URIs determined in the previous step. After this step, the method ends.

The method starts again if another or the same mobile streaming client performs a new pause.

Figure 9:
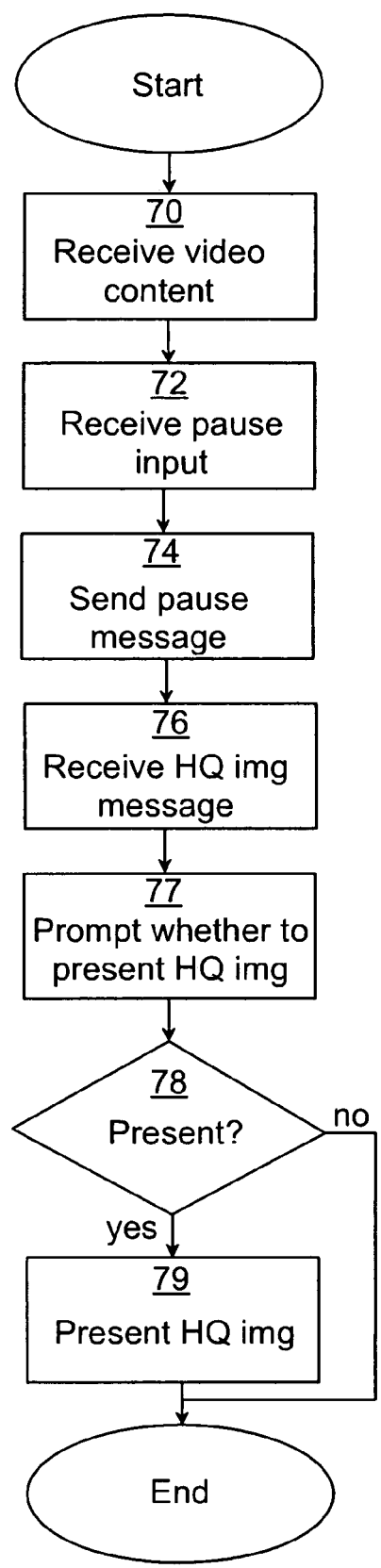
FIG. 9 is a flow chart illustrating a method performed in the mobile streaming client of FIG. 1.

FIG. 9 is a flow chart illustrating a method performed in the mobile streaming client of FIG. 1.

In an initial receive video content step 72, the mobile streaming client receives video from the streaming server.

The mobile streaming client then receives input, e.g. user input, that the streaming is to be paused at a pause timestamp in a receive pause input step 72. Optionally, the pause input can be a signal from another application of the streaming client that the streaming content should be paused, e.g. if the mobile streaming client has a phone application and there is an incoming phone call.

The mobile streaming client then sends a pause message in a send pause message step 74. This can for example be a PAUSE request sent using the RTSP protocol.

In a receive high quality image message 76, the mobile streaming client receives a high quality image message from the application server 10, where the high quality image message comprising a reference to a high quality image corresponding to an image of the video streaming content at the pause timestamp. The reference can for example be a URI corresponding to the format presented above.

In an optional prompt whether to present the high quality image step 77, the user is prompted whether to present the high quality image.

In an optional conditional present step 78, the mobile streaming client determines whether the user selects to present the high quality image or not. When the high quality image is to be presented, the method continues to a present high quality image step 79. Otherwise, the method ends.

In the present high quality image step 79, the high quality image for which a reference has been received is presented on the display of the mobile streaming client. This is performed by downloading the image file through the wide area network and presenting this image on the display. If steps 77 and 78 are omitted, the high quality image is always presented (when available). This reduces user interaction at the cost of slightly higher bandwidth usage, as the high quality image is downloaded each time.

Figure 10A:
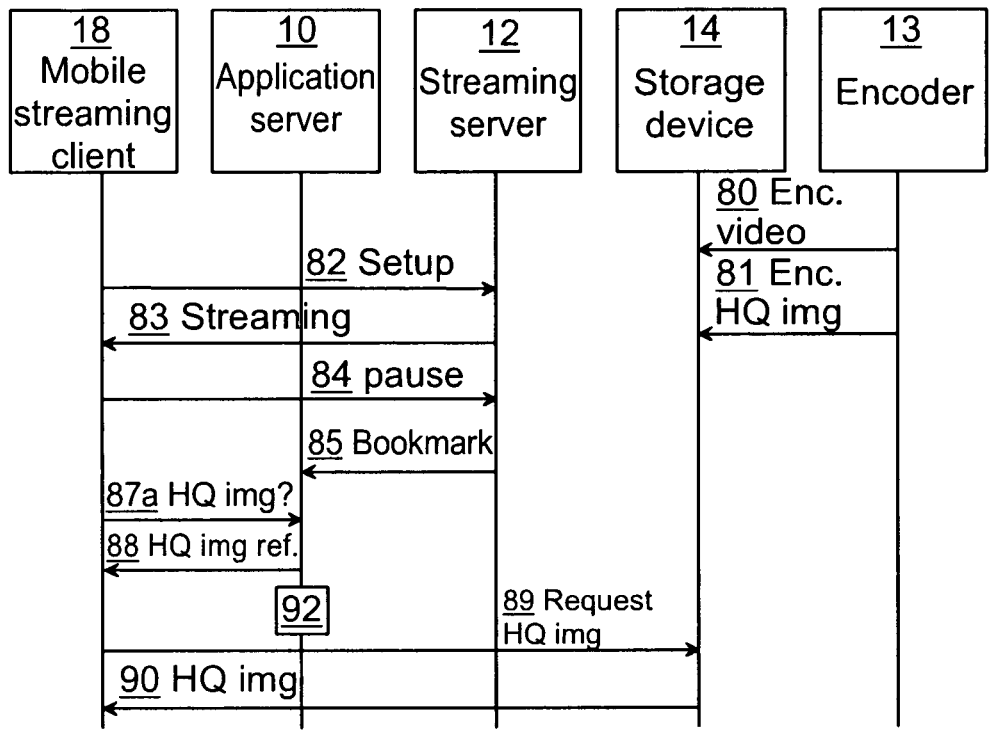
FIGS. 10a and 10b are sequence diagrams illustrating pausing for high quality images.
Figure 10B:
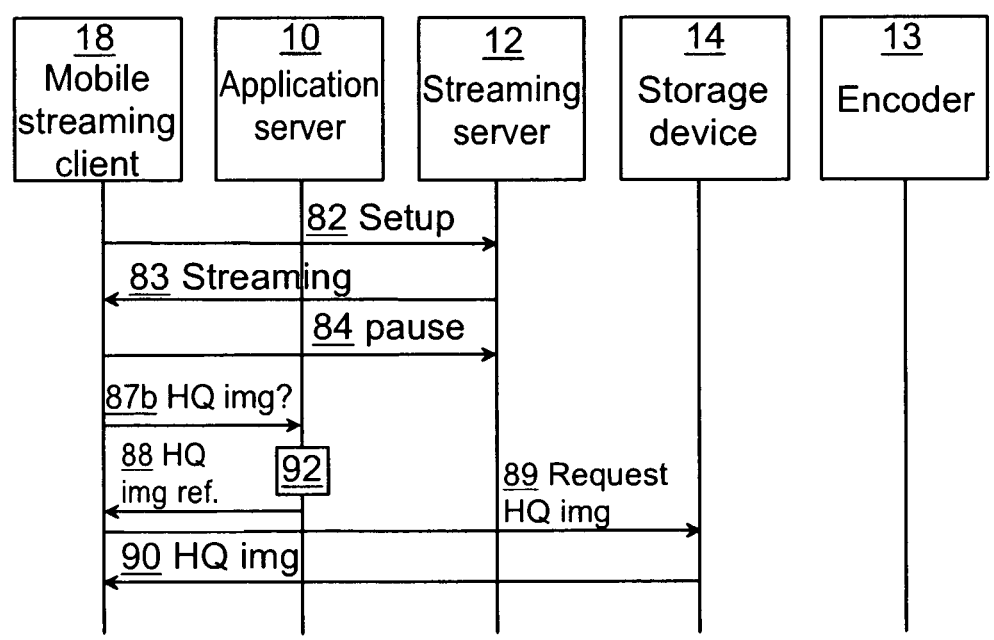

FIGS. 10*a* and 10*b* are sequence diagrams illustrating pausing for high quality images. The sequence diagrams correspond to the previously disclosed methods.

In FIG. 10*a*, the encoder 13 has access to the original content, e.g. a high quality video file or broadcast content. The encoder thus stores encoded video 80 and encoded high quality images 81 on the storage server. The encoded video is compressed compared to the original content to allow it to be streamed over lower bandwidth communication channels, e.g. a mobile (cellular network).

The mobile streaming client 18 requests 82 to set up a video stream to the streaming server 12, whereby the streaming server commences to stream content 83 to the mobile streaming client 18.

The mobile streaming client 18 then sends a pause message 84 to the streaming server 12. The streaming server creates a bookmark for the timestamp when the pause was received and sends the bookmark 85 to the application server 10. In this way, the application server 10 obtains the pause timestamp.

The mobile streaming client 18 then requests 87*a* a high quality image from the application server 10. In this embodiment, the request 87*a* does not contain the pause timestamp. This allows the method to be implemented with less modifications to the mobile streaming client.

The application server determines 92 the reference to the high quality image corresponding to the pause timestamp and sends a high quality image message 88 comprising the reference to the mobile streaming client 18. Optionally, in one embodiment, the application server sends a message containing data allowing the mobile streaming client 18 to access high quality images between a first timestamp (e.g. 51 of FIG. 7) and a second timestamp (e.g. 52 of FIG. 7), wherein the first timestamp 51 is before the pause timestamp 50 and the second timestamp 52 is after the pause timestamp 50. This allows the mobile streaming client to download several images to allow the user to step between high quality still images. The data/allowing the mobile streaming client 18 to access several images can be an array of still image references or it can be a first reference and a last reference, whereby the client conforms to a syntax to refer to the intermediate references.

Finally, the mobile streaming client 18 requests 89 the high quality image corresponding to the pause timestamp from the storage device 14 using the reference. Optionally, this is performed through the application server. If several references were sent in the previous step, the mobile streaming client can optionally download some or all of the still images referred to by the references.

The storage device 14 responds with the high quality image file 90 corresponding go the pause timestamp.

FIG. 10*b* is a sequence diagram for a slightly different embodiment than the one illustrated in FIG. 10*a*. The main difference between the two embodiments is the absence of a bookmark message of the embodiment of FIG. 10*b*. Also, FIG. 10*b* omits the encoding to improve clarity. It is to be noted, though, that the encoding steps 80, 81 of FIG. 10*a* can equally well be applied to the embodiment of FIG. 10*b*. As in FIG. 10*b*, the mobile streaming client 18 requests 82 streaming to be set up, whereby the streaming server 12 responds with content streaming 83. The mobile streaming client sends a pause message 84 to the streaming server 12.

Subsequently, the mobile streaming client 18 sends a request 87*b* for a high quality image. In this embodiment, the request 87*b* includes a pause timestamp, eliminating the need for the streaming server to create a bookmark and send the bookmark to the application server. In other words, the application server 10 obtains the pause timestamp from the mobile streaming client 18 in the request 87*b* for a high quality image.

The application server determines 92 the reference to the high quality image corresponding to the pause timestamp and sends a high quality image message 88 comprising the reference to the mobile streaming client 18.

Finally, the mobile streaming client 18 requests 89 the high quality image corresponding to the pause timestamp from the storage device 14 using the reference. Optionally, this is performed through the application server.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed in an application server, the application server being part of a video streaming system further comprising a streaming server and a mobile streaming client, the method comprising the steps of:
   establishing a connection with the mobile streaming client;
   obtaining a pause timestamp representing a time where the mobile streaming client has paused video streaming content while maintaining the connection with the mobile streaming client;
   determining a reference to a high quality image corresponding to an image of the video streaming content at the pause timestamp while maintaining the connection with the mobile streaming client, wherein the high quality image is of a higher quality than the image of the video streaming content and the high quality image is stored separately from the video streaming content; and
   sending a high quality image message to the mobile streaming client over the maintained connection comprising the reference to the high quality image,
   wherein the step of sending a high quality image message comprises sending data allowing the mobile streaming client to access high quality images within a timestamp range, the timestamp range including the pause timestamp.

2. The method according to claim 1, wherein the step of obtaining a pause timestamp comprises accessing a most recently stored bookmark of the video streaming content for the mobile streaming client, wherein the most recently stored bookmark comprises the pause timestamp.

3. The method according to claim 1, wherein the step of obtaining a pause timestamp comprises receiving a message from the mobile streaming client comprising the pause timestamp.

4. The method according to claim 1, wherein the high quality image is of a higher resolution than the image of the video streaming content.

5. The method according to claim 1, wherein the high quality image is an image previously encoded using only one frame of original content, and the image of the video streaming content is a predictive frame.

6. The method according to claim 1, wherein the reference is a URI pointing to the high quality image.

7. The method according to claim 1, further comprising the step, prior to the step of determining a reference, of:
   determining whether there are any high quality images stored for the video streaming content, and ending the method when there are no high quality images stored for the video streaming content.

8. The method according to claim 1, wherein the first timestamp is before the pause timestamp and the second timestamp is after the pause timestamp.

9. The method according to claim 8, wherein the number of high quality images between the first timestamp and the second timestamp is at most half of the frames of the video content corresponding to a sequence between the first timestamp and the second timestamp.

10. A method, performed in a mobile streaming client, the mobile streaming client being part of a video streaming system further comprising a streaming server and an application server, the method comprising the steps of:
    receiving over a connection with the streaming server video streaming content and rendering the video streaming content on a display of the mobile streaming client;
    receiving input to pause the video streaming content while maintaining the connection between the mobile streaming client and the streaming server;
    sending, while maintaining the connection between the mobile streaming client and the streaming server, a pause message indicating that the mobile streaming client has paused the video streaming content at a pause timestamp;
    receiving, while maintaining the connection between the mobile streaming client and the streaming server, a high quality image message from the application server, the high quality image message comprising a reference to a high quality image corresponding to an image of the video streaming content at the pause timestamp, wherein the high quality image is of a higher quality than the image of the video streaming content and the high quality image is stored separately from the video streaming content;
    prompting whether the high quality image is to be presented; and
    presenting the high quality image on the display of the mobile streaming client only after a user input has been received indicating that the high quality image is to be presented while maintaining connection between the mobile streaming client and the streaming server.

11. The method according to claim 10, wherein the step of receiving a high quality image message comprises receiving data allowing the mobile streaming client to access high quality images between a first timestamp and a second timestamp, wherein the first timestamp is before the pause timestamp and the second timestamp is after the pause timestamp.

12. An application server, configured to be part of a video streaming system further comprising a streaming server and a mobile streaming client, the application server comprising a controller and an input and output interface, wherein:
    the controller is configured to establish a connection with the mobile streaming client;
    the controller is configured to obtain a pause timestamp representing a time where the mobile streaming client has paused video streaming content while maintaining the connection with the mobile streaming client;
    the controller is configured to determine a reference to a high quality image corresponding to an image of the video streaming content at the pause timestamp while maintaining the connection with the mobile streaming client, wherein the high quality image is of a higher quality than the image of the video streaming content and the high quality image is stored separately from the video streaming content; and
    the controller is configured to send, using the input and output interface, a high quality image message to the mobile streaming client while maintaining the connection with the mobile streaming client comprising the reference to the high quality image,
    wherein the high quality image message includes data allowing the mobile streaming client to access high quality images within a timestamp range, the timestamp range including the pause timestamp.

13. A mobile streaming client, configured to be part of a video streaming system further comprising a streaming server and an application server, the mobile streaming client comprising a controller, a display, an input and output interface and a memory comprising computer program code which, when executed by the controller, implements a pausing function, wherein:
- the controller is configured to receive over a connection with the streaming server video streaming content and render the video streaming content on the display;
- the controller is configured to receive input to pause the video streaming content while maintaining the connection between the mobile streaming client and the streaming server;
- the controller is configured to send, while maintaining the connection between the mobile streaming client and the streaming server, a pause message indicating that the mobile streaming client has paused the video streaming content at a pause timestamp;
- the controller is configured to receive, while maintaining the connection between the mobile streaming client and the streaming server, a high quality image message from the application server, the high quality image message comprising a reference to a high quality image corresponding to an image of the video streaming content at the pause timestamp, wherein the high quality image is of a higher quality than the image of the video streaming content and the high quality image is stored separately from the video streaming content; and
- the controller is configured to present the high quality image on the display of the mobile streaming client only after a user input has been received indicating that the high quality image is to be presented while maintaining the connection between the mobile streaming client and the streaming server.

14. A computer program product including a non-transitory computer-readable storage medium storing a computer program for an application server, which application server, when in use, is part of a video streaming system further comprising a streaming server and a mobile streaming client, the computer program comprising computer program code which, when run on the application server, causes the application server to perform the steps of:
- establishing a connection with the mobile streaming client;
- obtaining a pause timestamp representing a time where the mobile streaming client has paused video streaming content while maintaining the connection with the mobile streaming client;
- determining a reference to a high quality image corresponding to an image of the video streaming content at the pause timestamp while maintaining the connection with the mobile streaming client, wherein the high quality image is of a higher quality than the image of the video streaming content and the high quality image is stored separately from the video streaming content; and
- sending a high quality image message to the mobile streaming client over the maintained connection comprising the reference to the high quality image,
- wherein the step of sending a high quality image message comprises sending data allowing the mobile streaming client to access high quality images within a timestamp range, the timestamp range including the pause timestamp.

15. A non-transitory computer-readable storage medium storing a computer program for a mobile streaming client, which mobile streaming client, when in use, is part of a video streaming system further comprising a streaming server and an application server, the computer program comprising computer program code which, when run on the mobile streaming client causes the mobile streaming client to perform the steps of:
- receiving over a connection between the mobile streaming client and the streaming server video streaming content and rendering the video streaming content on a display of the mobile streaming client;
- receiving input to pause the video streaming content while maintaining the connection between the mobile streaming client and the streaming server;
- sending, while maintaining the connection between the mobile streaming client and the streaming server, a pause message indicating that the mobile streaming client has paused the video streaming content at a pause timestamp;
- receiving, while maintaining the connection between the mobile streaming client and the streaming server, a high quality image message from the application server, the high quality image message comprising a reference to a high quality image corresponding to an image of the video streaming content at the pause timestamp, wherein the high quality image is of a higher quality than the image of the video streaming content and the high quality image is stored separately from the video streaming content;
- prompting whether the high quality image is to be presented; and
- presenting the high quality image on the display of the mobile streaming client only after a user input has been received indicating that the high quality image is to be presented while maintaining the connection between the mobile streaming client and the streaming server.

* * * * *

UNITED STATES PATENT AND TRADEMARK OFFICE
CERTIFICATE OF CORRECTION

| | | |
|---|---|---|
| PATENT NO. | : 9,113,177 B2 | Page 1 of 1 |
| APPLICATION NO. | : 13/639058 | |
| DATED | : August 18, 2015 | |
| INVENTOR(S) | : Molander | |

It is certified that error appears in the above-identified patent and that said Letters Patent is hereby corrected as shown below:

On the Title Page, in Item (57), under "ABSTRACT", in Column 2, Line 15, delete "client and" and insert -- client, --, therefor.

IN THE SPECIFICATION

In Column 5, Line 4, delete "FIG. 1;" and insert -- FIG. 1, --, therefor.

In Column 5, Line 27, delete "streaming client 16" and insert -- streaming client 18 --, therefor.

In Column 5, Lines 29-30, delete "streaming client 16" and insert -- streaming client 18 --, therefor.

In Column 8, Line 41, delete "to a determine high" and insert -- to determine a high --, therefor.

In Column 8, Line 49, delete "/content/fifa2010/game12/in" and insert -- /content/fifa2010/game12/ --, therefor.

In Column 8, Line 50, delete "the file system" and insert -- in the file system --, therefor.

Signed and Sealed this
Fifteenth Day of March, 2016

Michelle K. Lee
*Director of the United States Patent and Trademark Office*